(12) United States Patent
Madsen et al.

(10) Patent No.: US 8,419,363 B2
(45) Date of Patent: Apr. 16, 2013

(54) VARIABLE TRAILING EDGE SECTION GEOMETRY FOR WIND TURBINE BLADE

(75) Inventors: Helge Aagaard Madsen, Roskilde (DK); Flemming Rasmussen, Holeby (DK); Thomas Buhl, Greve (DK); Morten Hartvig Hansen, Roskilde (DK); Dan Christian Bak, Kgs. Lyngby (DK); Mac Gaunaa, Kirke Eskildstrup (DK); Peter Bjørn Andersen, Copenhagen (DK)

(73) Assignee: Danmarks Tekniske Universitet, Lyngby (DK)

( * ) Notice: Subject to any disclaimer, the term of this patent is extended or adjusted under 35 U.S.C. 154(b) by 641 days.

(21) Appl. No.: 12/307,474

(22) PCT Filed: Jul. 6, 2007

(86) PCT No.: PCT/DK2007/050085
§ 371 (c)(1),
(2), (4) Date: Feb. 2, 2009

(87) PCT Pub. No.: WO2008/003330
PCT Pub. Date: Jan. 10, 2008

(65) Prior Publication Data
US 2009/0290982 A1 Nov. 26, 2009

(30) Foreign Application Priority Data
Jul. 7, 2006 (DK) .................... 2006 00942

(51) Int. Cl.
*B64C 9/00* (2006.01)
(52) U.S. Cl.
USPC .............................................. 416/23; 416/13
(58) Field of Classification Search ................ 416/9–17, 416/23–24
See application file for complete search history.

(56) References Cited

U.S. PATENT DOCUMENTS

| 6,015,115 A | 1/2000 | Dorsett et al. |
| 6,199,796 B1 * | 3/2001 | Reinhard et al. ............ 244/35 R |

(Continued)

FOREIGN PATENT DOCUMENTS

| DE | 197 19 221 | 10/1998 |
| DE | 102 33 102 A1 | 1/2004 |

(Continued)

OTHER PUBLICATIONS

T. Buhl et al., "Potential Load Reduction Using Airfoils with Variable Trailing Edge Geometry", Journal of Solar Energy Engineering, 2005, vol. 127, 4, pp. 503-516.

(Continued)

*Primary Examiner* — Jenny L Wagner
*Assistant Examiner* — Mark Tornow
(74) *Attorney, Agent, or Firm* — Foley & Lardner LLP (57) ABSTRACT

A deformable trailing edge section (3) of a wind turbine blade (1), at least part of said section (3) being formed in a deformable material. The blade section (3) comprises one or more cavities (5) being in connection with or connectable to a fluid source in a way that allows fluid to stream from the fluid source to the cavity or cavities (5), so that the shape of the deformable trailing edge section (3) and thereby the camber of the blade cross-section (3) is changeable by the pressure of fluid in the cavity or cavities (5) with insignificant changes of the thickness and chord wise length of the deformable trailing edge section. Furthermore a wind turbine blade (1) is described, having at least one of such trailing edge section (s) (3) and to a system (11) for mounting a blade section (3) on a main blade (2) of a wind turbine. In addition a method of manufacturing a deformable trailing edge section (3) of a wind turbine blade (1) is disclosed.

32 Claims, 7 Drawing Sheets

U.S. PATENT DOCUMENTS

| | | | |
|---|---|---|---|
| 6,347,769 B1 * | 2/2002 | To et al. | 244/219 |
| 2008/0226448 A1 * | 9/2008 | Altmikus et al. | 416/23 |
| 2009/0074574 A1 * | 3/2009 | Godsk et al. | 416/41 |

FOREIGN PATENT DOCUMENTS

| | | |
|---|---|---|
| FR | 2 587 675 | 3/1987 |
| JP | 2006-248456 | 9/2006 |
| WO | WO 02/051730 A2 | 7/2002 |
| WO | WO 02/073031 A1 | 9/2002 |
| WO | WO 2004/088130 A1 | 10/2004 |
| WO | WO 2007/045940 A1 | 4/2007 |

OTHER PUBLICATIONS

N. Troldborg, "Computational Study of the Riso-B1-18 Airfoil Equipped with Actively Controlled Trailing Edge Flaps", Master Thesis Technical University of Denmark, Department of Mechanical Engineering, Fluid Mechanics 2004.

N. Troldborg, "Computational Study of the Riso-B1-18 Airfoil with a Hinged Flap Providing Variable Trailing Edge Geometry", Wind Engineering, vol. 29, No. 2, 2005, pp. 89-113.

\* cited by examiner

VARIABLE TRAILING EDGE SECTION GEOMETRY FOR WIND TURBINE BLADE

The present invention relates to wind turbine blades and particularly to blades having a deformable section.

BACKGROUND OF THE INVENTION

On most modern wind turbines, the pitch angle of the blades relative to the rotor plane can be controlled continuously. Hereby the inflow angle to the blade can be varied which is used e.g. for rotor speed, power and load control. However, due to the large size and weight of the present-day blades, the response time on the pitch angle is increasing. Instead blades can be designed where it is possible to change the shape of the rear part section of the blade locally, whereby it is possible to react faster and alleviate more of the fluctuating loads and reduce the aerodynamic noise. Such a blade design is disclosed in WO 2004/088130 in which the changes in the shape deformable blade sections are obtained by use of actuators.

Numerical and experimental studies disclosed in (Buhl, T. and Gaunaa, M. and Bak, C., "Potential Load Reduction Using Airfoils With Variable Trailing Edge Geometry", Journal of Solar Energy Engineering, 2005, vol. 127(4), pp. 503-516 and Troldborg, N. "Computational study of the Risø-B1-18 airfoil with a hinged flap providing variable trailing edge geometry", Wind Engineering, vol. 29(2), 2005, pp. 89-113) have been performed to give indications on the effect of deformable airfoils.

Deformable airfoils are known from U.S. Pat. No. 6,015,115 related to aircrafts. The deformable airfoils can be used to modify the shape of the aircraft wing before or during flight for obtaining desired flight characteristics. It may e.g. be advantageous to have a larger wing thickness for low speed flight than for high speed flight.

Other designs of airfoils comprising deformable elements are shown in WO 02/051730 and WO 2007/045940.

SUMMARY OF THE INVENTION

Today, wind turbines are regulated to keep a certain power at a certain wind speed. Furthermore, additional regulations are applied to alleviate loads from wind shear, inflow turbulence, yaw error etc. A typical manner of controlling the power is by pitch control.

"Trailing edge" as used herein, is typically used to describe the rear edge of the blade, i.e. typically the line along which the upper and lower surfaces of the blade intersect. However, the trailing edge may also be blunt and in such cases "trailing edge" refers to the rear most region of the blade which structurally connects the upper and lower parts of the blade. The blade cross-section is typically aerodynamically shaped as an airfoil section with a leading edge and a trailing edge. The chord of a blade cross-section is the straight line connecting the leading and trailing edges. The camber line of the blade cross-section is the mean thickness line connecting the leading and trailing edges.

"Trailing edge section" as used herein is typically used to describe a section of the blade comprising the trailing edge.

By "thickness" is meant the distance between the outer surfaces of the blade cross-section when measured perpendicular to the camber line of the blade cross-section. It will not be a single value but a thickness distribution.

It is an object of the present invention to provide further control of the power and load on a wind turbine blade than what is known from prior art technology, e.g. in the form of faster and distributed control along the blade span.

It is another object of the present invention to reduce aerodynamic noise from the wind turbine blade.

It is an object of embodiments of the present invention to enable protection of the trailing edge during transportation and to reduce the finish work of the trailing edge section during production of the blade.

It is another object of embodiments of the invention to allow for easy repair of active as well as passive trailing edge sections.

In a first aspect the present invention relates to a deformable trailing edge section of a wind turbine blade, at least part of said section being formed in a deformable material. The deformable trailing edge section comprises one or more cavities being in connection with or connectable to a fluid source in a way that allows fluid to flow from the fluid source to the cavity or cavities, so that the shape of the deformable trailing edge section and thereby the camber of the blade cross-sections are changeable by the pressure of fluid in the cavity or cavities.

The shape of the camber preferably takes place with insignificant changes of the thickness and chord wise length of the deformable trailing edge section.

Insignificant changes preferably refer to the fact that the effect of changed camber of the blade cross-sections is the primary desired effect on the aerodynamic forces. According to the invention, the trailing edge section is preferably stiff enough to carry external loads, such as aerodynamic forces, and still soft enough to be deformed to the desired shape in response to the pressure of the fluid in the cavities.

By the invention according to the first aspect of the present invention, faster control than with pitch control and a control that is distributed and variable along the blade span may typically be obtained.

The present invention may be used as the only control, or it may be used in addition to regulations known as collective pitch, cyclic pitch and individual pitch control when an additional control is advantageous to obtain a fast control of the aerodynamic loads and a reduction of aerodynamic noise. For a two-bladed teetering rotor, the variable trailing edge geometry can be used to control the teeter angle variations. The cavities of the trailing edge section may preferably be separately or collectively connected to the fluid source.

The one or more cavities preferably extend in the span wise direction of the blade. Alternatively or in addition thereto, the one or more cavities may extend in the chord wise direction.

The cavities may form two systems, wherein a system preferably is a single cavity or multiple interconnected cavities or multiple cavities with the same pressure, preferably placed in the upper and lower parts of the blade section, respectively. In addition, one or two of the system(s) may be constituted by subsystems, and the pressure in each subsystem may be varied independently of the pressure in the other subsystem(s).

Alternatively the cavities may form three or more systems, a system being preferably a single cavity or multiple interconnected cavities or multiple cavities with same pressure. Also for these embodiments, one or more of the system(s) may be constituted by subsystems, and the pressure in each subsystem may be varied independently of the pressure in the other subsystem(s).

Embodiments of the invention may have two or more cavities which are in connection with or connectable to two or more fluid sources. Each subsystem may be in connection to or connectable to a separate fluid source.

Preferably, the deformable trailing edge section has an initial un-deformed shape such that the camber of the blade cross-sections, and thereby the aerodynamic forces, are reduced when the pressures in all cavities equals the ambient pressure to ensure fault-safe operation in case of e.g. fluid pressure loss, or loss of control signals.

The deformable material may preferably be an elastic material such as polymers, e.g. rubber, natural rubber, polypropylene, polyethylene, nylon, elastomers, Kevlar (i.e. aramid), or the like. Alternatively or in combination thereto, the deformable material is made of foam from a polymer such as rubber or plastic. As a further alternative or combination, the deformable material may be a composite made from plastic with fiber reinforcements such as glass or carbon to strengthen the deformable material in selected areas and directions, preferably around one or more cavities to control their deformation under the fluid pressure.

A blade section according to the present invention may preferably be manufactured in one piece by moulding or extrusion. By molding or extrusion, stiffening members, such as e.g. fibres, can be embedded in the deformable material.

Alternatively, the blade section is manufactured in two or more subsections that are assembled, preferably by gluing or vulcanisation. A plate or membrane may preferably be placed between the subsections before assembling.

When the blade section is made from two subsections forming the upper and lower parts of the blade section, the plate or membrane may preferably be placed between these two subsections. The plate or membrane may be made from plastic or fibre-reinforced plastic or from metal, such as aluminium or steel.

A deformable trailing edge section according to the present invention may further comprise reinforcing means arranged in the span wise direction of the blade section. Such reinforcing means may preferably be one or more metal plates. Alternatively, the reinforcing means may be one or more rods or fibre mats.

A deformable trailing edge section according to the present invention may preferably comprise a flexible outer layer. Furthermore, the trailing edge section may preferably comprise means for mounting the blade section to a main blade.

Preferably the fluid is a liquid, such as a hydraulic oil or water. Alternatively or in combination therewith, the fluid is compressed gas.

In a deformable trailing edge section according to the present invention, the cavities are preferably selectively in fluid connection with or connectable to a fluid source in a way that enables establishment of a pressure difference between fluids in two or more of the cavities. Preferably, one or two of the systems contain(s) subsystems, each comprising at least one cavity, and a pressure difference can be established between the subsystems.

In a second aspect a wind turbine blade is provided. The blade preferably comprises a main blade and at least one deformable trailing edge section according to the first aspect of the invention. The blade may preferably further comprise at least one passive trailing edge section having a shape which is not deformable by changing the pressure of a fluid present within the passive trailing edge section. Alternatively or in combination thereto, the blade according to claims may preferably further comprise a system for mounting at least the deformable trailing edge section on the main blade.

Preferably, the length of the deformable trailing edge section in the chord wise direction may be between 1 and 70% of the chord length, such as between 1 and 30% or between 30 and 50% or between 50 and 70%, most preferably between 1 and 15%, such as between 1 and 10% of the chord length.

In a third aspect the present invention relates to a system for mounting a blade section on a main blade of a wind turbine, said system comprising at least one element fastened to the blade section, at least one element fastened to the main blade, and at least one interconnecting element establishing an assembling of the blade.

Figure 4A:
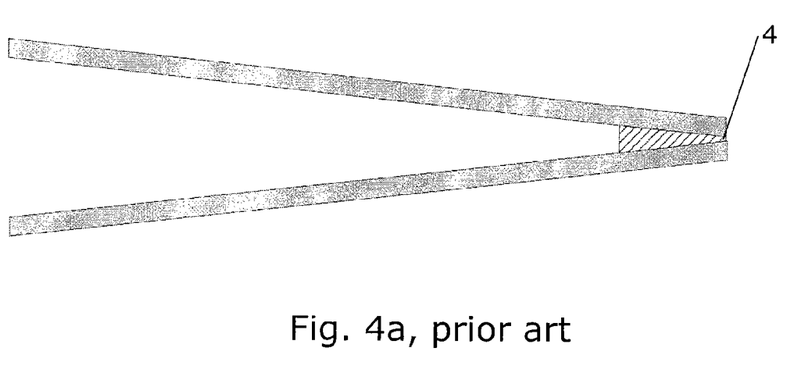

This aspect of the invention provides a potential to reduce the considerable finish work that often is necessary with present manufacturing techniques where the upper and lower blade parts, respectively, are glued together at the trailing edge (as indicated in FIG. 4a).

The blade section may preferably be a deformable trailing edge section according to the first aspect of the invention. Alternatively or in combination thereto the blade may be a blade according to the second aspect of the invention.

In a fourth aspect the present invention relates to a method of manufacturing a deformable trailing edge section comprising the step of establishing one or more cavities, preferably extending in the span wise direction of the blade section. Preferably, the method of manufacturing comprises the step of extruding the deformable trailing edge section.

Alternatively or in combination thereto, the method may comprise the steps of moulding the blade section without cavities, and establishing the cavities by removing material, such as by drilling, milling or cutting.

Alternatively or in combination thereto, the method may comprise establishing an interior section having an outer shape smaller than a final blade section and having grooves extending in the span wise direction of the section from the outer surface and towards the camber line of the blade cross-section, placing a profile in each of the grooves, said profiles having a lower melting temperature than the material from which the deformable trailing edge section is made, moulding an outer part of the deformable trailing edge section around the preliminary section, and removing the profiles placed in the grooves, e.g. by heating so that the material in the grooves becomes a fluid that can be pressed out.

As a further alternative or combination, the interior section may be established by moulding a section without grooves, and establishing the grooves by removing material, such as by drilling, milling or cutting.

In a fifth aspect, the present invention relates to a blade with one or more active trailing edge sections and one or more passive trailing edge sections where one or more sensors (e.g. accelerometers, strain gauges, fibre optics, smart materials, surface pressure devices, flow devices such as pitot tubes or the trailing edge itself) are placed in appropriate positions on the blade to monitor its operational state and where the signals from these sensors are used as input to the control system sending control signals to the active sections. A detailed description of passive and active trailing edge sections is given in the detailed description of preferred embodiments.

BRIEF DESCRIPTION OF THE DRAWINGS

In the following the invention and in particular preferred embodiments thereof will be described in details with reference to the drawings in which.

DETAILED DESCRIPTION OF PREFERRED EMBODIMENTS

Figure 1:
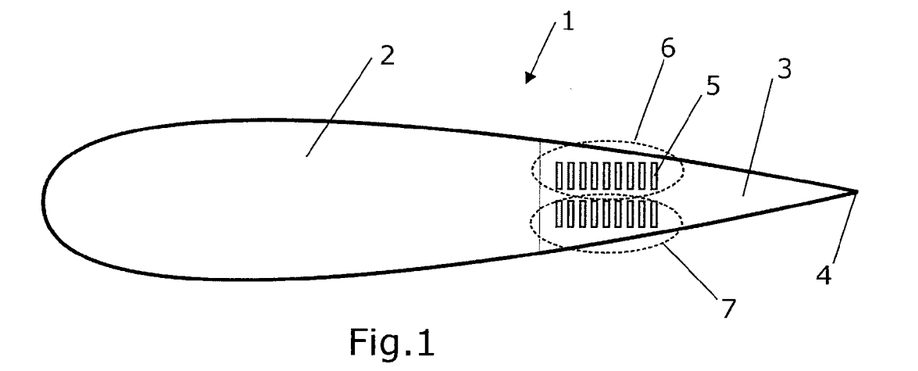
FIG. 1 shows schematically a cross section of a wind turbine blade having a deformable trailing edge section, FIG. 2.a shows schematically the overall principle of the invention. The deformation of the trailing edge section is obtained by pressure difference(s) in the cavities in the section. The cavities can be channels parallel to the blade span or cavities parallel to the chord wise direction, FIG. 2.b shows schematically a deformable trailing edge section in which the length direction of the cavities is in the chord wise direction.

The overall principle of the present invention is illustrated in FIG. 1 showing a cross-section of a wind turbine blade 1 comprising a main blade 2 and a deformable trailing edge section 3. The deformable section is named "trailing edge section" as it comprises the trailing edge 4 of the blade 1. The part 2 of the blade 1 that does not comprise the trailing edge 4 is denoted "main blade" in the following, even though the part 2 of the blade 1 may not constitute a blade on its own, and even though its cross-section may be less than half of the cross-section of the whole blade. The deformable trailing edge section 3 comprises cavities 5 which in the figure are shown to be placed in two rows. However, any number, position and cross-sectional shape of the cavities 5 may be possible within the scope of the invention. Furthermore, the cross sections of the cavities may differ from the one illustrated in FIG. 1, and they may vary along the length direction. The size of the cavities 5 will depend on the size of the trailing edge section 3. There may be 1 or more rows of cavities, typically 2 or 4, with 1 or more cavities in each row, typically 1 to 100 cavities, preferably 5-50 cavities. The geometry of the cavities will typically be rectangular, ellipsoidal, rectangular with inwards curved walls that would be straightened out when the fluid in the cavities is under pressure, or shape optimized. The deformable trailing edge section can be mounted on the main blade 2 at the blade manufacturing site or at the site for erecting the turbine.

In the following, the terms "upper system" 6 and "lower system" 7 will be used with reference to the illustration in FIG. 1. The actual mutual orientation of the systems 6, 7 will of course vary when the blade 1 is in use.

Figure 2A:
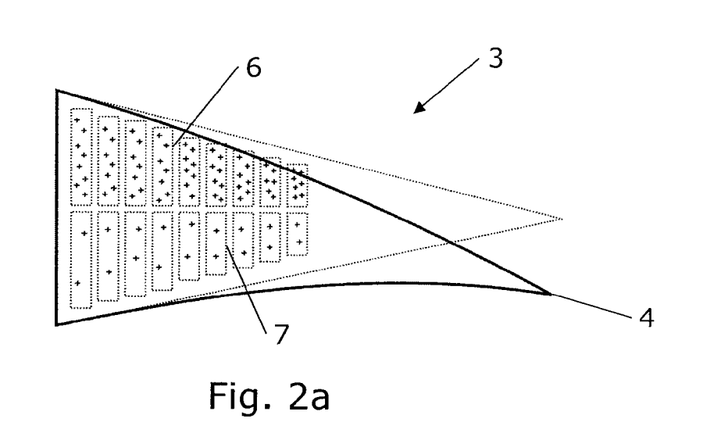
Figure 2B:
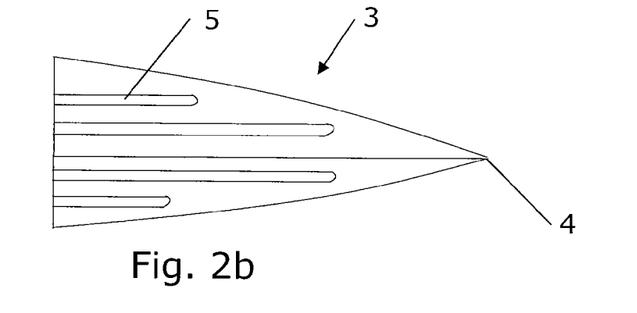

The cavities 5 are connected to a fluid source (not shown) which may e.g. be hydraulic oil, water or compressed gas. The shape of the trailing edge section 3 is varied by establishing pressure differences between the fluid in the upper and lower systems 6, 7 respectively. As an example, FIG. 2.a illustrates schematically how a higher pressure in the upper system 6 than in the lower system 7 will result in the trailing edge section 3 bending downwards. The dotted lines show the un-deformed shape when the pressures in the two systems 6, 7 are equal. It is also possible within the scope of the invention that the shape of an un-deformed blade is not symmetrical. The pressure may be the same in all cavities 5 of a system, but it is also possible that each system comprises two or more sub-systems in which the pressure can be varied independently of the other subsystem(s). This is possible both for each cross-section and along the blade length. Both for a deformed and an un-deformed trailing edge section 3, the average pressure in the cavities 5 can be higher than what is necessary to obtain a desired shape. Hereby the trailing edge section 3 can obtain a higher stiffness and thereby a larger stability. The cavities 5 will typically extend in the span wise direction of the trailing edge section 3, but they may alternatively extend in other directions, such as cavities having their length direction predominantly parallel to the chord of the blade 1 as shown in FIG. 2.b.

Figure 3:
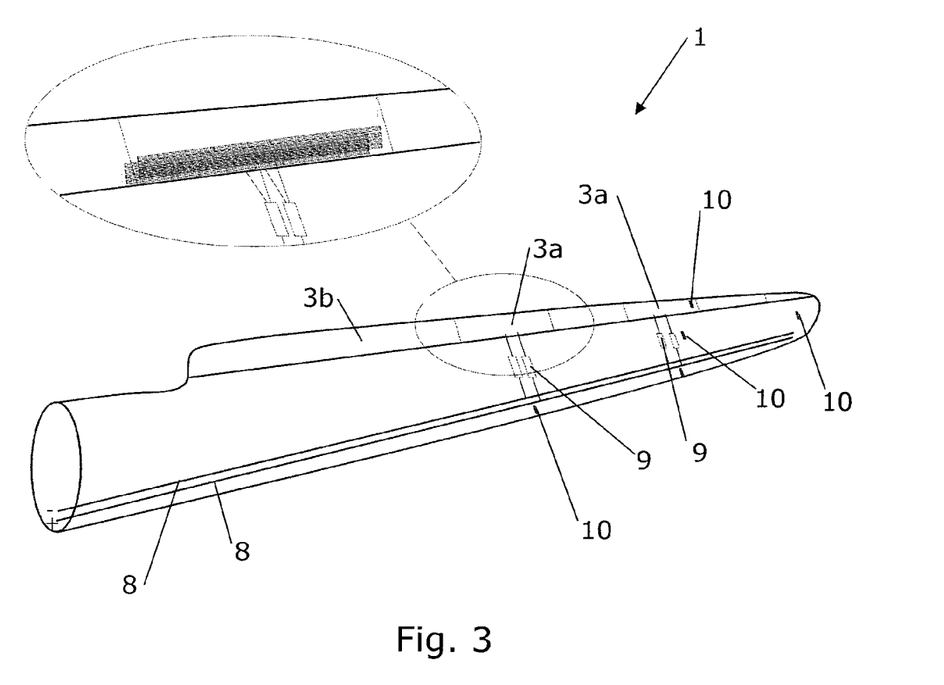
FIG. 3 shows a wind turbine blade having both active and passive sections along the length axis. Passive sections can be trailing edge sections with cavities or without cavities, respectively. The figure furthermore shows schematically a possible placing of the pressure tubes and sensors used for the control of the shape of the trailing edge sections, FIG. 4.a shows schematically a part of a wind turbine blade assembled by use of a traditional method, FIG. 4.b shows schematically a possible assembly of a wind turbine blade according to the present invention.

An example of a design with sub-sections along the length of the blade 1 is shown in FIG. 3. In the figure two of these sub-sections, denoted 3a, are active, i.e. the shape can be controlled through the pressure of the fluid in the cavities 5 as described above. In the following, a passive section, denoted 3b, means that its shape cannot be actively controlled through pressure of fluid in cavities 5 as described above. A passive section may or may not contain cavities corresponding to the ones of an active section. The shape of a passive sub-section may either be constant or, if the passive and active subsections are connected, dependent on its connections to the active sub-sections and the actual shape thereof. If the passive sub-sections are flexible, they may preferably be made from a deformable material having a continuous or a non-abrupt change on the trailing edge 4. This is important since abrupt changes in the trailing edge 4 will create noise emitted from the discontinuity.

FIG. 3 shows a system in which all the active sub-sections of a blade are connected to the same fluid source pipes 8, and the pressure in each sub-section is varied through pressure valves 9. The fluid source pipes 8 may be placed differently from what is shown in FIG. 3, such as closer to the trailing edge section 3, e.g. as a part of the assembly. Preferably, there will be 1 to 10 sections with lengths of e.g. 1%-5% of the blade length (measured in the span wise direction of the blade) in the outermost part of the blade. The width of the sections in the chord wise direction could e.g. be from 1 to 70%. Preferably, the deformable sections will have an extension in the chord wise direction ranging from 1 to 15% of the chord length.

The shape of the trailing edge sub-sections 3a is controlled by a control algorithm receiving input from sensors 10 placed on the blade 1. The sensors 10 can e.g. be accelerometers, strain gauges, fibre optics, smart materials, surface pressure devices, flow devices such as pitot tubes, or the trailing edge itself e.g. by measuring its deflection or variations in the cavity pressures. For a two-bladed turbine with a teetering rotor, the sensor signal could be the teeter angle, the teeter angular velocity or the teeter angular acceleration. Examples of possible positions of such sensors 10 are illustrated in FIG. 3.

Typically, the change in trailing edge section geometry will be used to reduce the fluctuating aerodynamic loads with time scales less than the time it takes for the rotor to turn one revolution. Such a continuous and relatively fast acting control of the geometry is possible because large variations of pressures in the cavities are obtained for even small fluid volume variations, especially if the fluid is a liquid, as the thickness of the trailing edge section is not changed significantly. The sensors 10 provide fluctuating sensor signals resulting from fluctuations in incoming wind caused e.g. by turbulence and wind shear, and these signals are used in an overall control method. In a preferred embodiment, the control method comprises deriving the difference between the instantaneous sensor signal and a time averaged value for the same sensor (e.g. averaged over the time of one rotor revolution) and feeding this into e.g. a PID controller, controlling the geometry of the trailing edge section 3 by controlling the pressure in the cavities 5. This controlling may be applied locally to each deformable section of a wind turbine blade, if more than one deformable section is applied to a number of deformable section controlled uniformly or all sections controlled uniformly.

The displacement of the trailing edge section 3 and hereby the change in aerodynamic loading (the deformation of the trailing edge section changes the camber of the trailing edge section 3 and thereby the lift coefficient) on the trailing edge section 3 will be a result of the pressure in the cavities 5. The displacement will be different for different pressures and be dependent on the size and shape of the trailing edge section 3, the cavities etc. One way of coming from an instantaneous sensor signal to the correct trailing edge section displacement is through experiments, e.g. wind tunnel measurements of the airfoil lift and drag characteristics at different pressures in the cavities 5, and data tables. Another way is by measuring the actual trailing edge section displacement by strain gauges etc. Furthermore, the control algorithm could be a self-learning algorithm such that the pressure will be adjusted according to the demands from the control algorithm.

The size of the trailing edge section(s) 3 will vary with the size of the blade 1 but also with the requirements to the load alleviation and power optimization at the specific site. At a turbulent site, a larger control surface (e.g. a longer active trailing edge section 3a in both span wise and chord wise direction) is necessary than at a less turbulent site. At a low turbulent site it might be enough with 1 meter active trailing edge section with a 5% chord length compared to a high turbulent site that could require 25 meters of active trailing edge sections with 20% chord length. This would either be estimated by manufactures, or this could be investigated by use of aeroelastic codes.

Figure 4B:
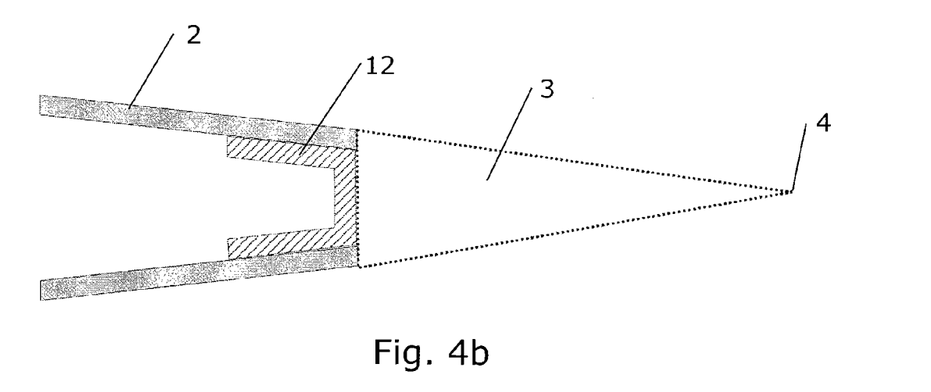

A trailing edge section 3 according to the present invention is preferably mounted on a blade 1 having a high structural stiffness. FIG. 4.a shows a rear part of a known wind turbine blade assembled by gluing the upper and lower parts of the blade together in the vicinity of the trailing edge 4. Such an assembling method typically results in a blunt trailing edge 4 having a thickness of about 1 to 5 mm. The actual thickness influences the amount and characteristics of the noise emitted from the blade 1. FIG. 4.b shows a possible assembly method according to the present invention. In the embodiment shown in FIG. 4.b, the upper and lower parts of the main blade 2 are attached to an assembly element 12. By making the trailing edge 4 less than 1 mm thick, the noise can be reduced compared to a traditional manufacturing method. Furthermore, such a design results in blades that have lower stress concentrations due to the assembly element 12.

Figure 5:
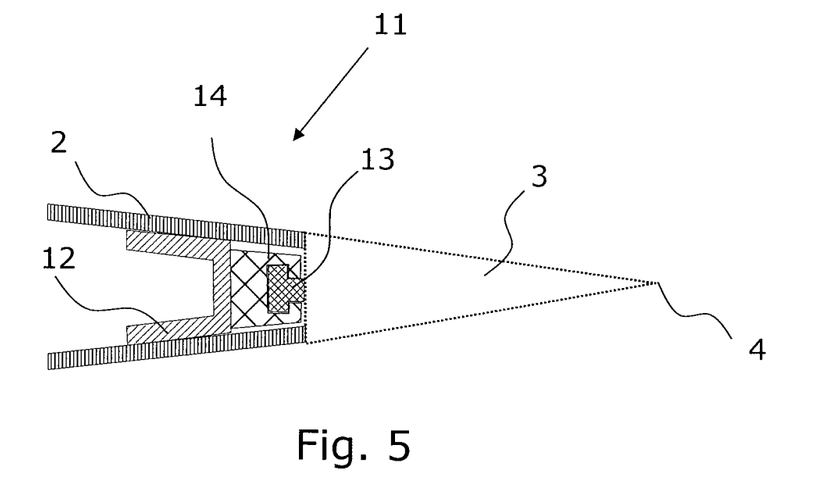
FIG. 5 shows schematically a possible layout of the assembly of a wind turbine blade having a deformable trailing edge section.

FIG. 5 shows a possible layout of the assembly system 11 of a wind turbine blade 1 having a deformable trailing edge section 3. However, it may of course also be used for undeformable trailing edge sections if desired. An assembly system 11 comprises an assembly element 12 mounted on the main blade 2, a mounting element 13 mounted on the trailing edge section 3, and one or more interconnecting element(s) 14 typically mounted on the assembly element 12 of the main blade 2. An advantage of such an assembly system 11 is that different types and sizes of trailing edge sections 3 can be mounted on a given main blade 2. Different types refer to a number of aspects including the geometry, whether it is passive or active, and the layout of the cavities in the active trailing edge sections 3. Hereby a given blade design can be optimized for use under different loading conditions, such as for offshore placement or dependent on the amount of turbulence at the actual site. It would also be possible to increase the total chord length by mounting a larger trailing edge section, and in this way the total solidity of the rotor can be changed and thereby its aerodynamic performance.

Figure 6:
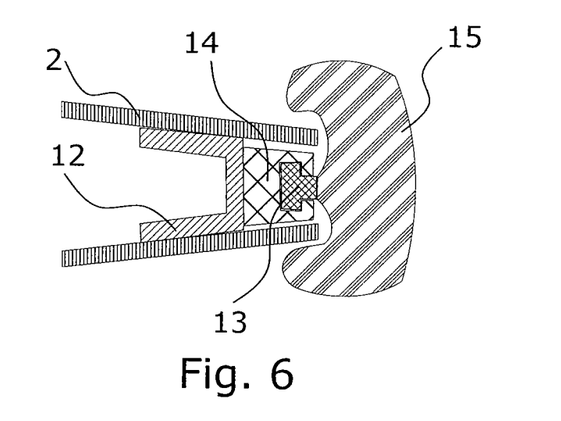
FIG. 6 shows schematically a possible use of a transportation section temporarily mounted in the holder to be used for mounting of the deformable trailing edge section, FIGS. 7.a-7.d show schematically steps in a possible manufacturing method according to the present invention.
Figure 7A:
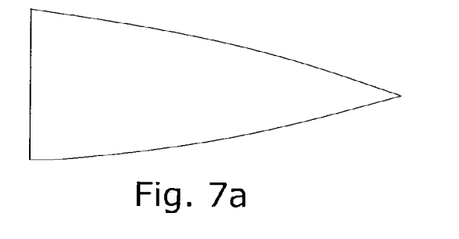
Figure 7B:
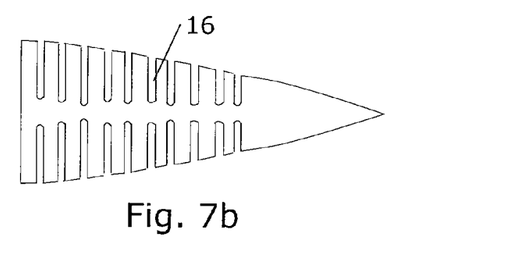
Figure 7C:
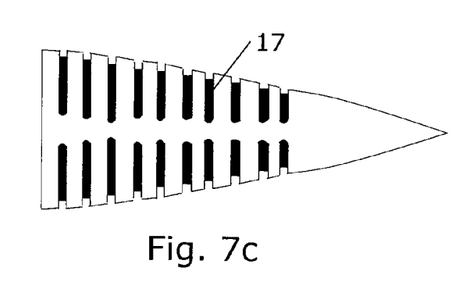
Figure 7D:
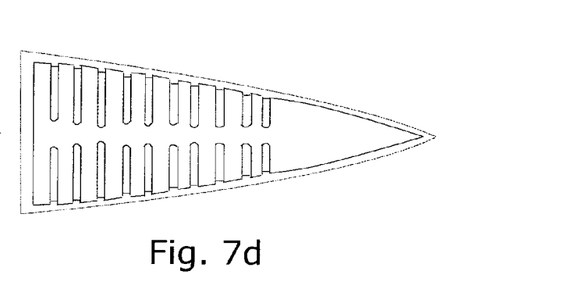

A further advantage of an assembly system 11 as described above is the possibility of using a dummy edge section 15 during transportation of the main blade 2, e.g. to the site of the wind turbine. Hereby the vulnerable trailing edge region can be protected with respect to both the trailing edge itself and the finish of the whole section. A possible design of such a dummy edge section 15 is shown in FIG. 6., When the main blade 2 reaches the site or when the rotor has been attached to the turbine, the dummy trailing edge sections 15 can be removed, and the active or passive trailing edge sections 3 can be attached.

Another advantage of an assembly system 11 is that it may allow for easy repair of active as well as passive trailing edges 3.

FIG. 7 shows schematically steps in another possible manufacturing method. FIG. 7.a shows an interior section, possibly moulded, without cavities. Grooves 16 extending from the outer surface are then established by e.g. drilling, milling or cutting; the resulting geometry is shown in FIG. 7.b. Alternatively this geometry may be obtained directly as the first step by moulding. FIG. 7.c shows the next step in which profiles 17 corresponding to the desired shape of the cavities 5 are placed in the grooves 16. The profiles 17 preferably have outer surfaces sufficiently smooth to allow extraction from the grooves 16. Furthermore, the material of the profiles 17 is chosen so that they do not change shape during molding of surroundings of the cavities 5. As shown in FIG. 7.d, a second moulding is used to obtain the final shape of the section, and the profiles 17 are removed. An alternative to this method is to place profiles 17 in the mould (not shown) before the deformable material is moulded. The profiles 17 are removed afterwards thereby forming the cavities 5. In another embodiment, the profiles 17 could be a liquid in a solid state at the time where the second molding is initiated. This solid material will then form the cavities 5 and afterwards or during the second molding, the solid state liquid is heated up again becoming liquid and can simply be pressed out by gas or another fluid. This last technique enables rather complex cavity structures to be formed.

A deformable trailing edge section 3 according to the present invention must be made in a material which ensures that the section is stiff enough to carry external loads, such as aerodynamic forces, and still soft enough to deform to the desired shape without being damaged.

The material may e.g. be a polymer, such as rubber. It is aimed at ensuring that the permeability of the material against the fluid in the cavities is low enough to ensure a satisfactory use without a need for a significant supply of fluid just to keep a desired pressure in the cavities.

To lower the weight of the blade, it may be advantageous to use foam made from rubber or plastic at least for a part of the trailing edge section.

In relation to the choice of material, the actual site of the wind turbine must also be taken into account. The demands with respect to weather resistance may e.g. be higher if the wind turbine is to be placed offshore.

Figure 8:
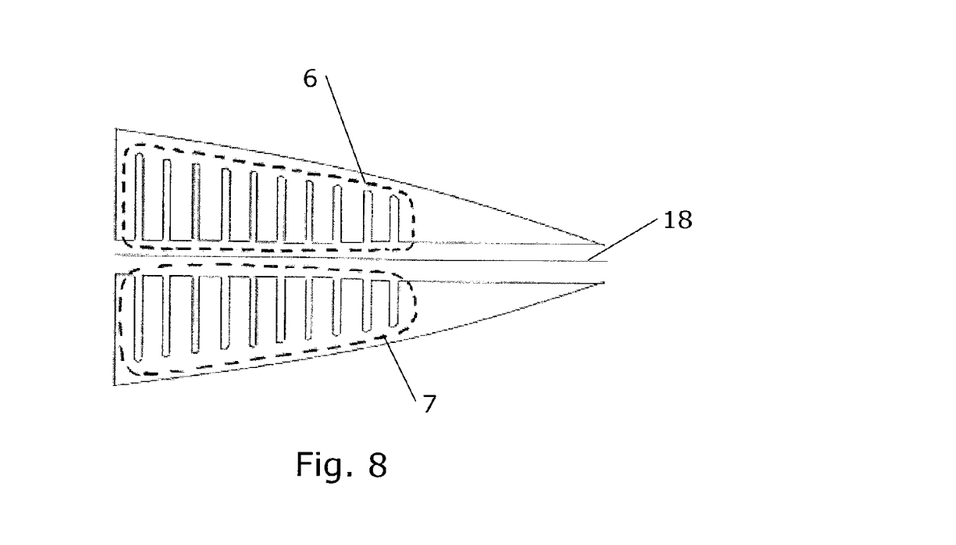
FIG. 8 shows schematically an alternative layout comprising a thin plate or membrane.

The trailing edge section 3 may be made in one part or in two or more parts which are joined afterwards, e.g. by vulcanisation or gluing. If a higher stiffness is needed, it may be obtained by mounting a thin plate 18, such as a metal, or a polymer membrane 18 between the parts before assembly as illustrated schematically in FIG. 8. The plate or membrane 18 may form one of the sides in the cavities 5 as shown in FIG. 8. A different or additional way of giving the trailing edge section 3 a higher stiffness is to have a positive average pressure in the two main pressure systems 6, 7. The size of the average pressure may be variable dependent on the actual necessary stiffness.

Figure 9:
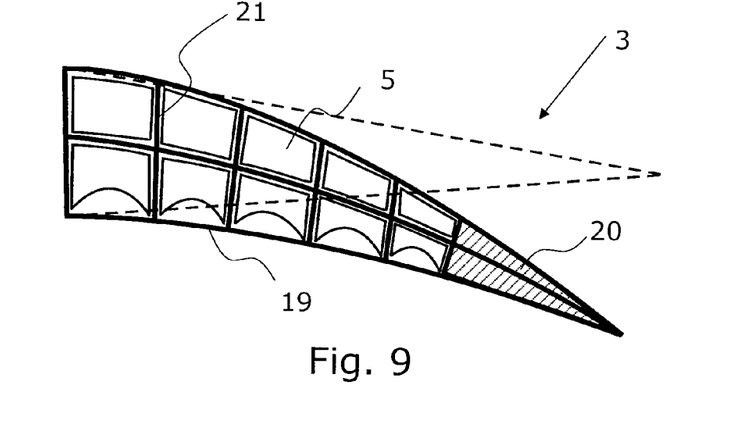
FIG. 9 shows schematically possible further embodiment of the invention, wherein the trailing edge section comprises an outer layer.

FIG. 9 shows schematically possible further embodiment of the invention. The trailing edge section 3 may be covered by a flexible outer layer 19 that ensures an outer surface where deformations of the cavities 5 are smoothened out even when the cavities 5 are significantly deformed. This may be provided by only fastening the flexible outer layer 19 at some points. To avoid deformation of the surface from outer pressure, the flexible outer layer could be pre-stressed in tension. Such a flexible outer layer 19 may also be used to improve the weather resistance of the trailing edge section 3.

An area 20 next to the trailing edge 4 may be constituted by solid material, i.e. without cavities, whereby it is possible to make the trailing edge sharp and thereby ensure a low noise emission and high aerodynamic performance. If desired, additional stiffness can be obtained e.g. by plates 21 between the cavities 5, or by reinforcement, such as rods or fibre mats (not shown), placed e.g. adjacent to the solid area 20. This reinforcement may preferably be added during the manufacturing, but it may also be possible to add external reinforcement afterwards, such as by gluing. The reinforcements can be directly inserted in the molding or in the extrusion process.

Figure 10:
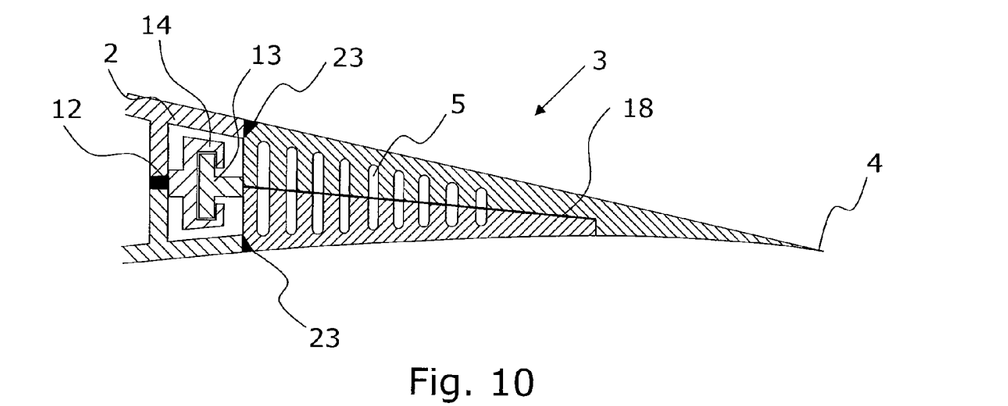
FIG. 10 shows schematically a possible design of the assembly point where the deformable trailing edge section is mounted to the main blade.

FIG. 10 shows a section of another preferred embodiment of the trailing edge section 3 manufactured in two halves having a dividing element 18, such as a plate or membrane, between them as described above. The figure furthermore illustrates that the trailing edge section 3 may be manufactured so that one of the parts (the upper part in the figure) comprises the whole area next to the trailing edge 4. The trailing edge section 3 preferably comprises elastic joints 23 of highly resilient material to allow for large deformations of the trailing edge section 3 without damage of material in the region where the trailing edge section 3 abut the main blade 2. The figure also shows a preferred embodiment of the mounting of the deformable trailing edge section 3 to the main blade 2, where a mounting element 13 on the deformable trailing edge section 3 is slid into an interconnecting element 14 mounted on the main blade 2. These mounting and interconnecting elements 13, 14 may not extend along the whole span of the trailing edge section 3.

Figure 11:
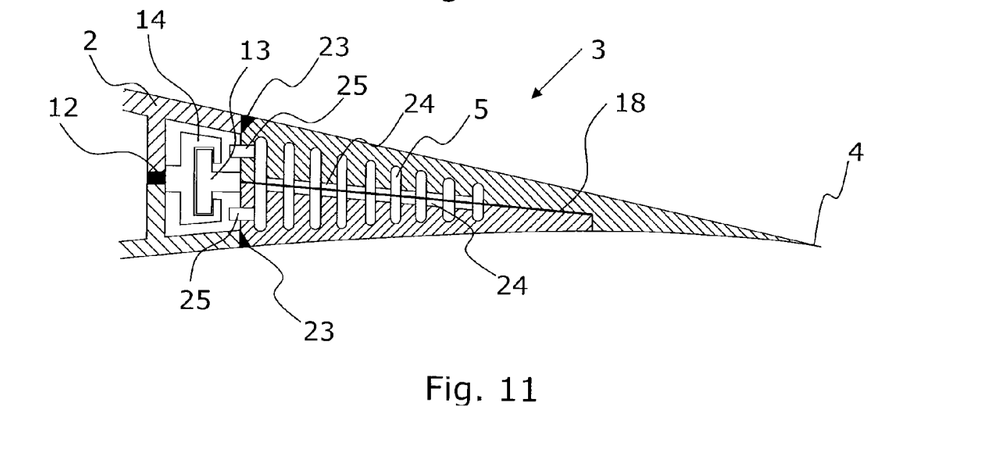
FIG. 11 shows schematically a section through a deformable trailing edge section in which mounting and interconnecting elements do not extend along the whole blade in the span wise direction. The connections to pipes leading fluid to the cavities run at positions where there are no mounting and interconnecting elements.

FIG. 11 shows another section of the preferred embodiment of the trailing edge section 3 in FIG. 10, where the cavities 5 on the upper and lower parts are connected through channels 24 to form two main pressure systems 6,7, thereby allowing for fluid flow to and from the fluid pipes 8 (not shown) independently through the connection 25 between the pipe (not shown) and the trailing edge section 3. The figure further shows that the connections 25 to pipes (not shown) leading fluid to the cavities 5 run at positions where there are no mounting and interconnecting elements 13 and 14.

Figure 12:
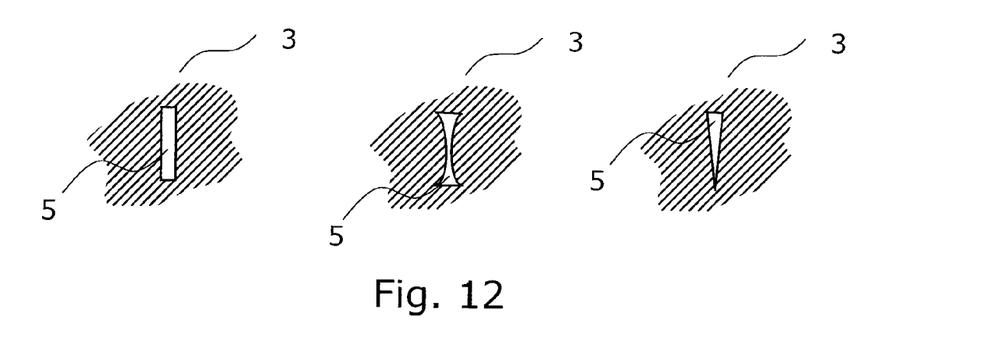
FIG. 12 shows schematically possible designs of a cavity.

FIG. 12 shows schematically three possible designs of a cavity 5 which may be obtained from ingenuity, or systematic methods such as shape optimization.

Figure 13:
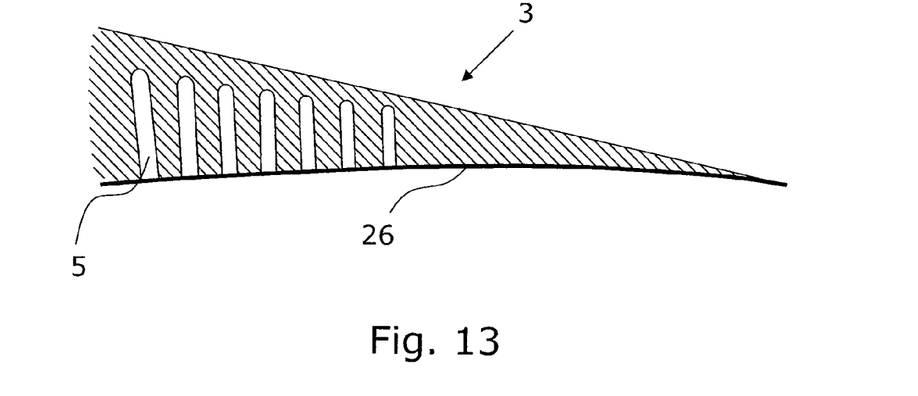
FIG. 13 shows schematically a deformable trailing edge section where the cavities form a single system interconnected to a fluid source.

FIG. 13 shows another preferred embodiment of the deformable trailing edge section (3) where the cavities (5) form a single system interconnected to a fluid source (not shown). A much stiffer member 26, such as a plate or membrane, is fastened to lower surface of the deformable trailing edge section 3, whereby the changing of the fluid pressure in the preferably single system of cavities 5 causes the camber of the deformable trailing edge section 3 to change accordingly.

The invention claimed is:

1. A deformable trailing edge blade section for a wind turbine blade, at least part of said deformable trailing edge blade section being formed from a deformable material, said deformable trailing edge blade section comprising:
   a trailing edge; and
   cavities in connection with or connectable to a fluid source in a way that allows fluid to flow from the fluid source to the cavities, so that a shape of the deformable trailing edge blade section and thereby a camber of the blade cross-section is changeable by a pressure of fluid in the cavities with insignificant changes in thickness and chord-wise length of the deformable trailing edge blade section,
   wherein a length of the deformable trailing edge blade section in a chord wise direction is between 1 and 30%, and
   wherein the cavities are offset from a camber line of the blade cross-section so that alteration of the pressure of fluid in the cavities results in bending of the deformable trailing edge blade section and thereby movement of the trailing edge.

2. A deformable trailing edge blade section according to claim 1, wherein the cavities are separately or collectively connected to the fluid source.

3. A deformable trailing edge blade section according to claim 1, wherein the cavities form two systems, each of the two systems being a single cavity or multiple interconnected cavities or multiple cavities with a same pressure.

4. A deformable trailing edge blade section according to claim 3, wherein one or two of the system(s) is/are constituted by subsystems, and wherein a pressure in each subsystem can be varied independently of a pressure in other subsystem(s).

5. A deformable trailing edge blade section according to claim 1, wherein the cavities are in connection with or connectable to two or more fluid sources of the fluid source.

6. A deformable trailing edge blade section according to claim 1, wherein an initial un-deformed shape of the deformable trailing edge blade section is such that the camber, and thereby aerodynamic forces, are reduced if pressures in all the cavities equals ambient pressure to ensure fault-safe operation in case of fluid pressure loss or loss of control signals.

7. A deformable trailing edge blade section according to claim 1, wherein the deformable material is an elastic material.

8. A deformable trailing edge blade section according to claim 1, wherein the deformable material is foam made from a polymer.

9. A deformable trailing edge blade section according to claim 1, wherein the deformable material is a composite made from plastic with fiber reinforcements to strengthen the deformable material in selected areas and directions to control deformation of the selected areas subject to the pressure of fluid.

10. A deformable trailing edge blade section according to claim 1, wherein the deformable trailing edge blade section is one piece.

11. A deformable trailing edge blade section according to claim 1, wherein the deformable trailing edge blade section is two or more subsections.

12. A deformable trailing edge blade section according to claim 11, wherein a plate or membrane is between the subsections.

13. A deformable trailing edge blade section according to claim 1, further comprising a reinforcing element in a span wise direction of the deformable trailing edge blade section.

14. A deformable trailing edge blade section according to claim 1, further comprising a flexible outer layer.

15. A deformable trailing edge blade section according to claim 1, further comprising an element for mounting the deformable trailing edge blade section to a main blade.

16. A wind turbine blade, comprising a main blade and at least one deformable trailing edge blade section according to claim 1.

17. A wind turbine blade according to claim 16, further comprising at least one passive trailing edge section having a shape which is not deformable by changing pressure of a fluid present within the passive trailing edge section.

18. A wind turbine blade according to claim 16, further comprising a system for mounting at least the deformable trailing edge blade section on the main blade.

19. A system for mounting a blade section on a main blade of a wind turbine blade, said system comprising:
   at least one element fastened to the blade section,
   at least one element fastened to the main blade, and
   at least one interconnecting element establishing an assembling of the wind turbine blade, wherein the blade section is a deformable trailing edge blade section according to claim 1.

20. A system for mounting a blade section on a main blade of a wind turbine blade, said system comprising:
   at least one element fastened to the blade section,
   at least one element fastened to the main blade, and
   at least one interconnecting element establishing an assembling of the wind turbine blade, wherein the blade section is a deformable trailing edge blade section, and wherein the wind turbine blade is a wind turbine blade according to claim 16.

21. A wind turbine blade with one or more active trailing edge sections and one or more passive trailing edge sections where one or more sensors is/are placed in appropriate positions on the wind turbine blade to monitor an operational state of the wind turbine blade, and where signals from the one or more sensors are used as input to a control system sending control signals to the one or more active trailing edge sections, wherein the one or more active trailing edge section(s) is/are deformable trailing edge blade section(s) according to claim 1.

22. A deformable trailing edge blade section according to claim 1, wherein the length of the deformable trailing edge blade section in the chord wise direction is between 1 and 15%.

23. A deformable trailing edge blade section according to claim 1, wherein the length of the deformable trailing edge blade section in the chord wise direction is between 1 and 10%.

24. A deformable trailing edge blade section according to claim 3, wherein the two systems are placed in an upper and a lower part of the trailing edge blade section, respectively, and wherein establishment of pressure differences between the fluid in the upper and lower parts results in bending of the deformable trailing edge blade section.

25. A deformable trailing edge blade section according to claim 7, wherein the elastic material is selected from rubber, natural rubber, polypropylene, polyethylene, nylon, elastomers, or aramid.

26. A deformable trailing edge blade section according to claim 9, wherein the fiber reinforcements are glass or carbon.

27. A deformable trailing edge blade section according to claim 9, wherein the selected areas and directions are around one or more cavities.

28. A deformable trailing edge blade section according to claim 11, wherein glue or vulcanization connects the two or more subsections together.

29. A deformable trailing edge blade section according to claim 21, wherein the one or more sensors is/are selected from the a group consisting of: accelerometers, strain gauges, surface pressure devices, flow devices, fibre optics, smart materials, or the trailing edge.

30. A deformable trailing edge blade section according to claim 29, wherein the flow devices comprise pitot tubes.

31. A deformable trailing edge blade section according to claim 1, wherein the cavities are on a same side of the camber line.

32. A deformable trailing edge blade section according to claim 1, wherein the cavities comprise a single row of cavities.

* * * * *